BEST AVAILABLE COPY
GRISCOM & DENNS.
Lime Kiln.
No. 192. A. I. Patented Feb. 23, 1858.
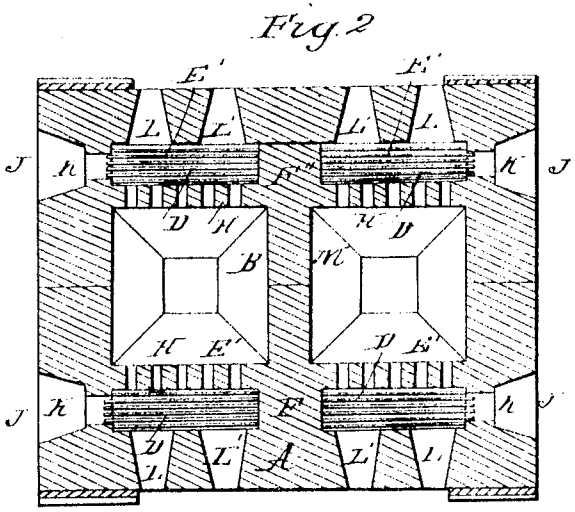
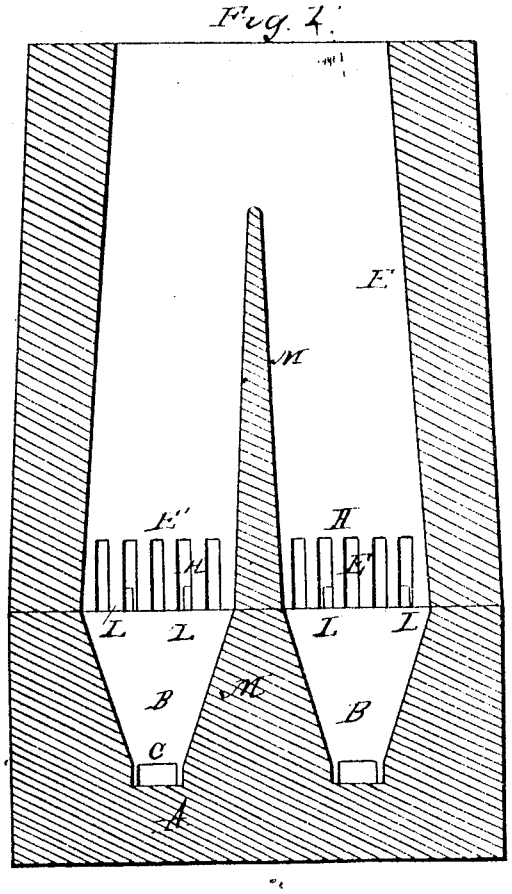
NO PRINTED SPECIFICATION AVAILABLE